(12) United States Patent
Kireev et al.

(10) Patent No.: US 8,453,092 B2
(45) Date of Patent: *May 28, 2013

(54) T-COIL NETWORK DESIGN FOR IMPROVED BANDWIDTH AND ELECTROSTATIC DISCHARGE IMMUNITY

(75) Inventors: Vassili Kireev, Sunnyvale, CA (US); James Karp, Saratoga, CA (US); Toan D. Tran, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/441,809

(22) Filed: Apr. 6, 2012

(65) Prior Publication Data

US 2012/0188671 A1   Jul. 26, 2012

Related U.S. Application Data

(63) Continuation of application No. 12/615,173, filed on Nov. 9, 2009, now Pat. No. 8,181,140.

(51) Int. Cl.
| | |
|---|---|
| *G06F 17/50* | (2006.01) |
| *H03K 19/00* | (2006.01) |
| *H03K 25/00* | (2006.01) |
| *H01F 21/02* | (2006.01) |
| *H01F 29/00* | (2006.01) |
| H03K 19/0175 | (2006.01) |
| H03K 19/003 | (2006.01) |
| H01F 27/28 | (2006.01) |
| H01L 25/07 | (2006.01) |
| H01L 25/16 | (2006.01) |

(52) U.S. Cl.
CPC ........ *G06F 17/5072* (2013.01); *G06F 17/5077* (2013.01); *G06F 17/5081* (2013.01); *H03K 19/017545* (2013.01); *H03K 19/017509* (2013.01); *H03K 19/00346* (2013.01); *H01F 21/02* (2013.01); *H01F 29/00* (2013.01); *H01F 27/28* (2013.01); *H01L 25/071* (2013.01); *H01L 25/16* (2013.01)

USPC .......... 716/120; 716/119; 716/122; 716/123; 716/129; 716/130; 326/38; 326/101; 336/15; 336/69; 336/70

(58) Field of Classification Search
CPC .............. G06F 17/5072; G06F 17/5077; G06F 17/5081; H03K 19/017509; H03K 19/017545; H03K 19/00346; H01L 25/071; H01L 25/16; H01F 21/02; H01F 29/00; H01F 27/28
USPC ................. 716/119, 120, 122, 123, 129, 130; 326/38, 101; 336/15, 69, 70
See application file for complete search history.

(56) References Cited

U.S. PATENT DOCUMENTS

| 3,155,927 A | 11/1964 | True |
|---|---|---|
| 5,545,048 A | 8/1996 | Sano et al. |

(Continued)

FOREIGN PATENT DOCUMENTS

| CN | 101800424 A | * | 8/2010 |
|---|---|---|---|
| KR | 2009102890 A | * | 10/2009 |

OTHER PUBLICATIONS

U.S. Appl. No. 12/615,173, Kireev, Vassili, filed Nov. 9, 2009.

(Continued)

*Primary Examiner* — Phallaka Kik
(74) *Attorney, Agent, or Firm* — Kevin T. Cuenot

(57) ABSTRACT

An embodiment of a circuit is described that includes a first inductor comprising a first end and a second end, where the first end of the first inductor forms an input node of the circuit. The embodiment of the circuit further includes a second inductor comprising a first end and a second end, where the second end of the first inductor is coupled to the first end of the second inductor forming an output node of the circuit; a resistor coupled to the second end of the second inductor; and an electrostatic discharge structure coupled to the output node and configured to provide an amount of electrostatic discharge protection, where the amount of electrostatic discharge protection is based on a parasitic bridge capacitance and a load capacitance metric.

16 Claims, 3 Drawing Sheets

U.S. PATENT DOCUMENTS

| | | | | |
|---|---|---|---|---|
| 6,114,877 | A * | 9/2000 | Brown et al. | 326/96 |
| 6,396,137 | B1 * | 5/2002 | Klughart | 257/691 |
| 7,391,192 | B2 * | 6/2008 | Ostrom et al. | 323/274 |
| 7,802,220 | B1 * | 9/2010 | Popovich et al. | 716/120 |
| 8,181,140 | B2 * | 5/2012 | Kireev et al. | 716/122 |
| 2003/0102923 | A1 | 6/2003 | Vickram et al. | |
| 2005/0135182 | A1 * | 6/2005 | Perino et al. | 365/230.06 |
| 2005/0172246 | A1 | 8/2005 | Logie et al. | |
| 2006/0044099 | A1 * | 3/2006 | Gill | 336/130 |
| 2006/0236275 | A1 * | 10/2006 | Groos | 716/4 |
| 2009/0039916 | A1 | 2/2009 | Buchmann et al. | |
| 2009/0103372 | A1 * | 4/2009 | Shau | 365/189.02 |
| 2010/0237975 | A1 * | 9/2010 | Lai | 336/170 |
| 2011/0051301 | A1 * | 3/2011 | Thijs et al. | 361/57 |
| 2011/0084736 | A1 * | 4/2011 | Papaefthymiou et al. | 327/108 |

OTHER PUBLICATIONS

Chen et al., "Design and Optimization of a Compact, Repetitive, High-Power Microwave System", Review of Scientific Instruments, vol. 76, No. 10, Oct. 2005, abstract only.

Galali et al., Broadband ESD Protection Circuits in CMOS Technology, IEEE Journal of Solid State Circuits, vol. 38, No. 12, Dec. 2003, pp. 2334-2340.

Huang, Bo-Jr., et al., "Design and Analysis for a 60-GHz Low-Noise Amplifier with RF ESD Protection", IEEE Transactions on Microwave Theory and Techniques, vol. 57, No. 2, Feb. 1, 2009, pp. 299-300.

Musolino et al., "Pulse Forming Network Optimal Design for the Power Supply of Eml Lauchners", IEEE Transactions on Magnetics, vol. 33, No. 1, Jan. 1997, pp. 480-483.

Neuber et al., "A Compact, Repetitive, 500KV, 500 J. Marz Generator", IEEE, 2005, pp. 1203-1206.

Pillai et al., "Novel T-Coil Structure and Implementation in a 6.4-gb/s CMOS Receiver to Meet Return Loss Specifications", 2007 Electronic Components and Technology Conference, IBM, 2007, pp. 147-153.

Selmi, L. et al., "Small-Signal MMIC Amplifiers with Bridged T-Coil Matching Networks", IEEE Journal of Solid-State Circuits, vol. 27, No. 7, Jul. 1, 1992, pp. 1093-1096.

* cited by examiner

T-COIL NETWORK DESIGN FOR IMPROVED BANDWIDTH AND ELECTROSTATIC DISCHARGE IMMUNITY

CROSS-REFERENCE TO RELATED APPLICATIONS

This application is a continuation of U.S. patent application having the application Ser. No. 12/615,173, now U.S. Pat. No. 8,181,140, filed on Nov. 9, 2009 and titled "T-Coil Network Design for Improved Bandwidth and Electrostatic Discharge Immunity" by Vassili Kireev, James Karp, and Toan D. Tran.

FIELD OF THE INVENTION

One or more embodiments disclosed within this specification relate to integrated circuit devices (ICs). More particularly, one or more embodiments relate to a circuit comprising a T-coil network for use with high frequency inputs or outputs of an IC.

BACKGROUND

The frequency of input or output (referred to as "input/output" hereinafter) signals provided to integrated circuit devices (ICs) has steadily increased over time. As the frequency of input/output signals reaches radio frequency (RF) ranges and approach the gigahertz range, complex impedances at the input/output node often result. The complex impedance of an IC input/output node can create impedance matching issues between the source of the input/output signal and the input/output node of the IC. Impedance mismatches can degrade performance of the input/output node, if not the IC in general.

Complex impedances are a function of multiple small capacitances and inductances associated with devices coupled to the input/output node of the IC. These small capacitance and inductances can include gate capacitances, inductances and capacitances associated with interconnect lines, packaging bond wire inductances, capacitance associated with input/output pads, capacitances associated with electrostatic discharge structures, and the like.

An impedance mismatch between a source of an input/output signal and an input/output node of an IC results in inefficient delivery of signal power to the input/output node since a percentage of the power of the input/output signal is reflected back from the input/output node to the source of the input/output signal. In addition, an impedance mismatch leads to a reduction in bandwidth of the input/output node since the small inductances and capacitances become more significant at higher frequencies.

To avoid signal power loss, RF systems strive to create a purely resistive impedance at each RF input/output and RF output. To offset complex impedances at IC input/output nodes, matching networks can be implemented at input/output nodes of the IC that seek to cancel the complex impedances. Without matching networks, many IC input/outputs would be band limited with maximum operating frequencies well below the frequency range of a desired input/output signal.

SUMMARY

An embodiment of a circuit comprises a first inductor comprising a first end and a second end; wherein the first end of the first inductor forms an input node of the circuit; a second inductor comprising a first end and a second end; wherein the second end of the first inductor is coupled to the first end of the second inductor forming an output node of the circuit; a resistor coupled to the second end of the second inductor; and an electrostatic discharge structure coupled to the output node and configured to provide an amount of electrostatic discharge protection; wherein the amount of electrostatic discharge protection is based on a parasitic bridge capacitance and a load capacitance metric.

Another embodiment of a circuit comprises a first inductor comprising a first end and a second end; wherein the first end of the first inductor forms an input node of the circuit; a second inductor comprising a first end and a second end; wherein the second end of the first inductor is coupled to the first end of the second inductor forming an output node of the circuit; a resistor coupled to the second end of the second inductor; and an electrostatic discharge structure coupled to the output node and configured to provide an amount of electrostatic discharge protection; wherein a parameter of at least one of the first inductor or the second inductor is based on a parasitic bridge capacitance and a load capacitance metric.

An embodiment of a T-coil network comprises a first inductor; a second inductor that is coupled to the first inductor; and a resistor that is coupled to the second inductor, wherein a parameter of the first inductor and the second inductor is based on a parasitic bridge capacitance and a load capacitance metric.

DETAILED DESCRIPTION OF THE DRAWINGS

While the specification concludes with claims defining the features of one or more embodiments of the invention that are regarded as novel, it is believed that the embodiments of the invention will be better understood from a consideration of the description in conjunction with the drawings. As required, detailed embodiments of the present invention are disclosed herein; however, it is to be understood that the disclosed embodiments are merely exemplary of the inventive arrangements, which can be embodied in various other forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of one or more embodiments of the invention.

One or more embodiments disclosed within this specification relate to semiconductor integrated circuit devices (ICs). More particularly, one or more embodiments relate to designing a T-coil network for use with an input/output node of an IC. In accordance with the inventive arrangements disclosed within this specification, a T-coil network design technique is provided that accounts for capacitances overlooked by conventional design techniques. One or more embodiments further balance different capacitive quantities by modifying aspects of the T-coil design by adding more electrostatic discharge (ESD) elements and/or modifying parameters of the inductors of the T-coil network such as a width of the coils of the inductors of the T-coil network. Both approaches not only help to maximize bandwidth of the T-coil network and minimize distortions, but also serve to increase ESD protection provided to the input/output node of the IC.

Figure 1:
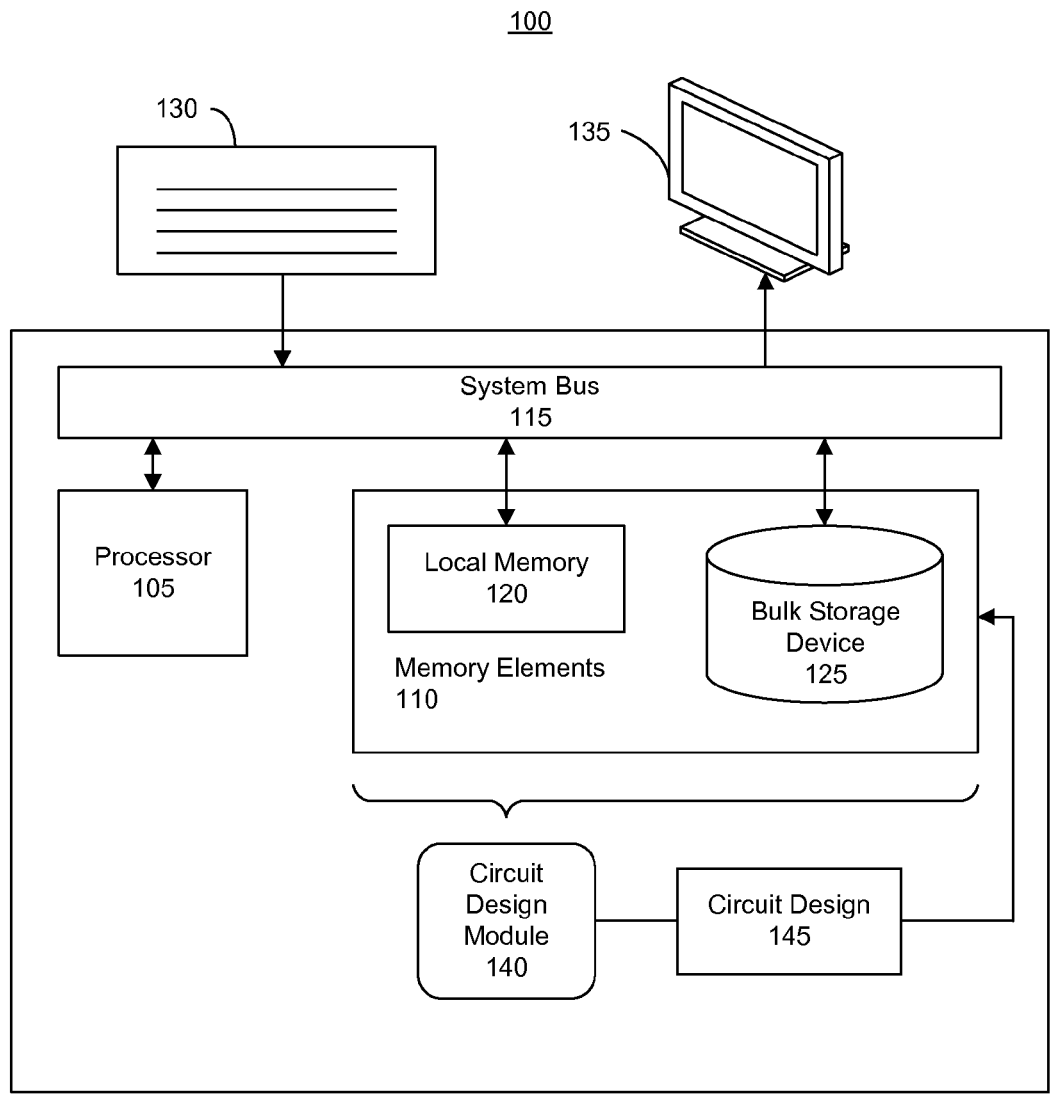
FIG. 1 is a block diagram illustrating a system for designing a T-coil network for implementation within an integrated circuit device (IC) in accordance with one embodiment of the present invention.

FIG. 1 is a block diagram illustrating a system 100 for designing a T-coil network for implementation within an IC in accordance with one embodiment of the present invention. In one aspect, system 100 can generate one or more T-coil network designs for instantiation within an IC.

As pictured in FIG. 1, system 100 can include at least one processor 105 coupled to memory elements 110 through a system bus 115. As such, system 100 can store program code within memory elements 110. Processor 105 can execute the program code accessed from memory elements 110 via system bus 115. In one aspect, for example, system 100 can be implemented as computer that is suitable for storing and/or executing program code. It should be appreciated, however, that system 100 can be implemented in the form of any system comprising a processor and memory that is capable of performing the functions described within this specification.

Memory elements 110 can include one or more physical memory devices such as, for example, local memory 120 and one or more bulk storage devices 125. Local memory 120 refers to random access memory or other non-persistent memory device(s) generally used during actual execution of the program code. Bulk storage device(s) 125 can be implemented as a hard drive or other persistent data storage device. System 100 also can include one or more cache memories (not shown) that provide temporary storage of at least some program code in order to reduce the number of times program code must be retrieved from bulk storage device 125 during execution.

Input/output (I/O) devices such as a keyboard 130, a display 135, and a pointing device (not shown) optionally can be coupled to system 100. The I/O devices can be coupled to system 100 either directly or through intervening I/O controllers. Network adapters also can be coupled to system 100 to enable system 100 to become coupled to other systems, computer systems, remote printers, and/or remote storage devices through intervening private or public networks. Modems, cable modems, and Ethernet cards are examples of different types of network adapters that can be used with system 100.

Memory elements 110 can store a circuit design module 140. Circuit design module 140, being implemented in the form of executable program code, can be executed by system 100. Circuit design module 140 can receive a design specification for a circuit that comprises a T-coil network. Circuit design module 140 further can determine and/or obtain, e.g., read, extracted component values for one or more components or aspects of a circuit design and/or the T-coil network included within such a circuit design, that are stored within memory elements 110. A T-coil network generally includes two inductors coupled in series with an input/output load coupled to the T-coil network at the coupling point between the two inductors. The T-coil network can reduce or cancel the complex impedances associated with a capacitive load at the IC input/output. The implementation of a T-coil network at an input/output node of an IC can increase the bandwidth of that input/output node. This improvement results in better RF system performance of the input/output node by, for example, reducing return loss, decreasing bit error rates, or increasing power gain.

Using the design specification and extracted component values, circuit design module 140 can determine a first estimated value for a total bridge capacitance across two inductors, denoted as $C_B$, within the T-coil network. Circuit design module 140 can calculate a value for each of the two inductors, denoted as $L_1$ and $L_2$, within the T-coil network using the greater of the first value of $C_B$ or a load capacitance metric seen at the output node of the T-coil network, denoted as $C_L/12$. Circuit design module 140 can determine a second value of $C_B$ using an inter-winding capacitance derived using the values of $L_1$ and $L_2$.

Circuit design module 140 can compare the value of $C_B$ to a metric that depends upon the value of $C_L$, e.g., a load capacitance metric, and increase either the value for $C_B$ or the value of $C_L$ until the two values are equal or approximately equal, e.g., within a predetermined range or tolerance of one another. $C_B$ can be increased, for example, by increasing the inter-winding capacitance of $L_1$ and $L_2$. $C_L$ can be increased, for example, by increasing an amount of ESD protection applied to the output node of the T-coil network.

The resulting parameters such as values for $C_B$, $C_L$, $L_1$, and $L_2$, the amount of ESD protection used, and other parameters relating to the inductors $L_1$, and $L_2$, e.g., width of windings of the inductors, can be output as, or included within, circuit design 145 and stored within memory elements 110. As used herein, "outputting" and/or "output" can mean storing in memory elements 110, for example, writing to a file stored in memory elements 110, writing to display 135 or other peripheral output device, playing audible notifications, sending or transmitting to another system, exporting, or the like.

Figure 2:
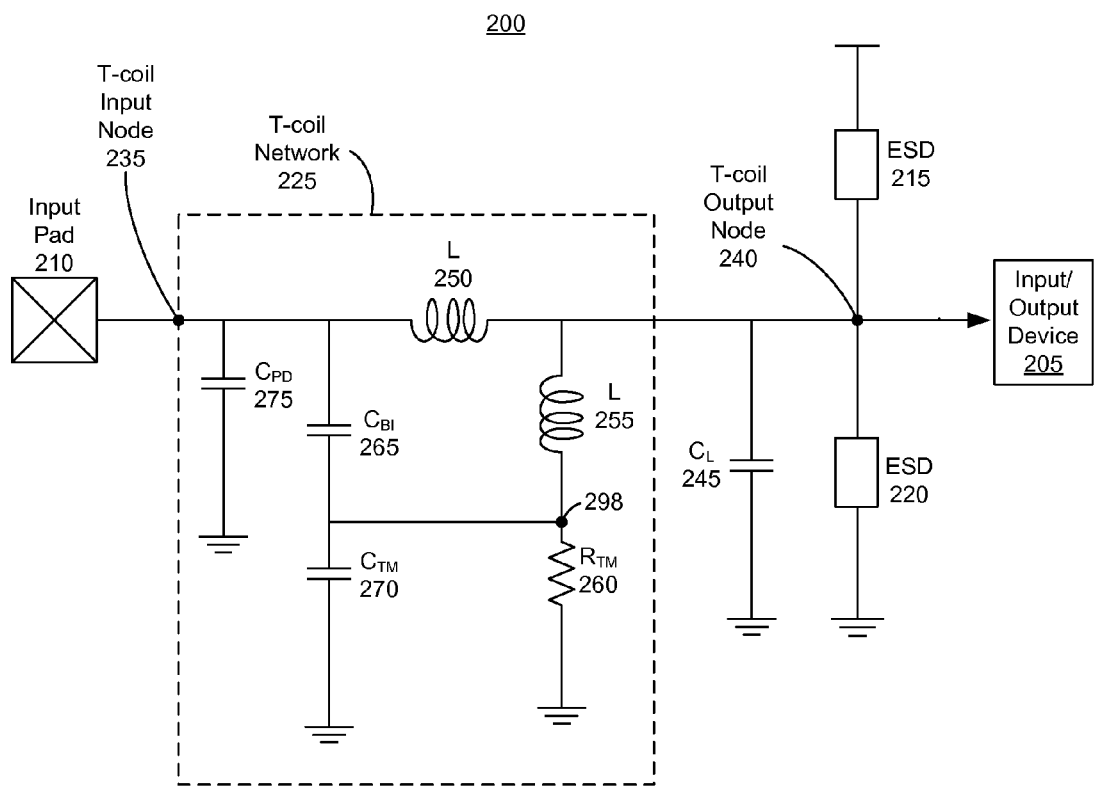
FIG. 2 is a circuit diagram illustrating an exemplary circuit comprising a T-coil network in accordance with another embodiment of the present invention.

FIG. 2 is a circuit diagram illustrating an exemplary circuit 200 comprising a T-coil network in accordance with another embodiment of the present invention. Circuit 200 illustrates an input/output node of an IC. As shown, a T-coil network has been implemented to improve matching of the impedance of the input/output node of the IC with the impedance of an output of a source providing an input/output signal to the input/output of the IC. Circuit 200 can include an input/output device 205, an input/output pad 210, ESD devices 215 and 220, and T-coil network 225.

Input/output device 205 can be any input/output device within an IC that is configured to receive an external high frequency signal as an input/output. Input/output device 205 can be coupled to additional input/output circuitry within the IC. Additional input/output circuitry represents additional devices or circuitry that can be coupled to input/output device 205 for processing the input/output signal received via input/output pad 210.

An input/output signal is provided to input/output pad 210. The input/output signal can be a radio frequency (RF) input/output signal, e.g., a high speed digital signal. Input/output pad 210 can be any pad structure available within an IC manufacturing process that allows a signal external to the IC to be provided to the internal circuitry of the IC. Input/output pad 210 is coupled to T-coil network 225 at T-coil input/output node (input/output node) 235. Input/output pad 210 can be part of a signal path coupling the input/output signal to input/output device 205.

ESD devices 215 and 220 are coupled to a T-coil output node (output node) 240. Output node 240 provides signal to input/output device 205. In FIG. 2, ESD devices 215 and 220 are implemented as ESD diodes. It should be appreciated, however, that ESD devices 215 and 220 can be any device within an IC manufacturing process capable of providing protection from ESD events to input/output device 205. For example, the ESD devices 215 and 220 can be diodes, however, ESD devices 215 and 220 are not limited to just diodes.

T-coil network 225 can include two inductors, denoted as L 250 and L 255, and a termination resistor, denoted a $R_{TM}$ 260. T-coil network 225 can include a plurality of parasitic capacitances. The parasitic capacitances, though not actual circuit elements, are represented in FIG. 2 as $C_L$ 245, $C_{BI}$ 265, $C_{TM}$ 270, and $C_{PD}$ 275.

$C_L$ 245 represents a sum of the parasitic capacitances appearing at output node 240 and, thus, the input/output node of input/output device 205. Accordingly, $C_L$ 245 represents the load capacitance seen by T-coil network 225. $C_L$ 245 can include a variety of parasitic capacitances associated with devices coupled to output node 240. For example, $C_L$ 245 can include gate capacitances associated with input/output device 205, capacitance associated with interconnect lines coupling devices to output node 240, capacitances associated with ESD devices 215 and 220, and the like. $C_L$ 245, along with various parasitic inductances and capacitances associated with the IC and IC packaging, can create a complex impedance to a source providing the high frequency input/output signal to input/output device 205.

$C_{BI}$ 265 represents an inter-winding capacitance associated with inductors L 250 and L 255. As used within this specification, "inter-winding capacitance" refers to a parasitic capacitance caused by capacitive coupling between closely spaced windings of an inductor. Inter-winding capacitance increases as the width of the windings of an inductor is increased. Correspondingly, inter-winding capacitance decreases as the width of the windings is decreased. Thus, the value of $C_{BI}$ 265 increases as the width of the windings of each of L 250 and L 255 increases. The value of $C_{BI}$ 265 decreases as the width of the windings of each of L 250 and L 255 is decreased. Since the values of L 250 and L 255 are matched, the value of $C_{BI}$ 265 can be said to increase, or decrease as the case may be, according to the width of one or both of L 250 and L 255.

It should be appreciated that while the width of the windings of the inductors is listed as one parameter of the inductors and T-coil network to be modified, other parameters relating to routing of the inductors can be modified as well to effect a change in the inter-winding capacitance $C_{BI}$ 265 of inductors L250 and L255. For example, the spacing, e.g., distance, between windings of inductors L250 and 255 can be varied. In another example, a grounded metal shield can be placed beneath the T-coil. Aspects of the shield can be further varied to influence the inter-winding capacitance $C_{BI}$.

$C_{TM}$ 270 can represent various capacitances associated with termination resistor $R_{TM}$ 260. For example, $C_{TM}$ 270 can represent parasitic capacitances created by capacitive coupling between a polysilicon layer used to implement $R_{TM}$ 260 on an underlying substrate layer of the IC. $C_{PD}$ 275 can represent various capacitances associated with input/output pad 210. For example, $C_{PD}$ 275 can represent parasitic capacitances created by capacitive coupling between the metal layers used to implement input/output pad 210 and the underlying substrate layer of the IC.

Parasitic capacitances $C_{BI}$ 265, $C_{TM}$ 270, and $C_{PD}$ 275 can collectively be referred to as a bridge capacitance of T-coil network 225. In one embodiment, the bridge capacitance, denoted as $C_B$, generally can be determined by taking $C_{PD}$ 275 and $C_{TM}$ 270 in series with the resulting quantity in parallel with $C_{BI}$ 265. This relationship can be rewritten in the form $C_B=[(C_{TM}*C_{PD})/(C_{TM}+C_{PD})]+C_{BI}$. For purposes of clarity, the reference numbers of FIG. 2 have been excluded from the rewritten equation.

When implemented at an input/output node, T-coil network 225 can cancel the complex impedances associated with input/output device 205 and present a predominantly resistive impedance to a source, which generates a high frequency input/output signal to drive input/output device 205. Typically, input and output nodes of an RF system are designed to have a matched characteristic impedance of 50 ohms. Accordingly, the resistance of the source ($R_{source}$) and $R_{TM}$ 260 each can be implemented with characteristic impedances of approximately 50 ohms. T-coil network 225, when properly implemented, can have the effect of cancelling complex impedances seen by the output of the source which generates the input/output signal so that the input/output node of the IC is seen by this source as purely resistive with the resistance of the source ($R_{source}$) being approximately equal to $R_{TM}$ 260.

Conventional T-coil network design techniques evaluate $C_{BI}$ to determine whether $C_{BI}$ is less than required by cancellation equations and, based upon that evaluation, add a physical capacitor $C_{BL}$ to meet the requirements for cancellation. More particularly, based upon the evaluation of $C_{BI}$, conventional T-coil network design techniques incorporate physical capacitor $C_{BL}$, which would be coupled to input/output node 235 and node 298. Such techniques seek to reduce $C_L$ 245 to an allowable value that the source which generates the input/output signal can adequately drive. Other considerations that influence $C_L$ 245 include, for example, the amount of ESD protection desired and a maximum tolerable loss of bandwidth at the input/output node of the IC. Thus, the process starts with less than ideal assumptions. The values of L 250 and L 255 are calculated as a function of $C_L$ 245. The value of k, which is the mutual inductance between L 250 and L 255, is set to 0.5±0.1. $C_{BI}$ 265 then is extracted using an electromagnetic (EM) simulation tool with L 250 and L 255 set to the previously calculated values. Using the relationship $C_B=C_{BI}+C_{BL}$, $C_{BL}$ can be increased until $C_B=C_L/12$ to maximize bandwidth.

Conventional T-coil network design techniques, as described above, do not account for loop back capacitance created by $C_{TM}$ 270 and $C_{PD}$ 275, which are modeled in FIG. 2. The exclusion or absence of $C_{TM}$ 270 and $C_{PD}$ 275 from conventional T-coil network design techniques results in an inaccurate impedance matching of the T-coil network to the source which generates the input/output signal. Within conventional T-coil network design techniques, bridge capacitance $C_B$ is, therefore, defined as $C_B=C_{BI}+C_{BL}$. Conventional T-coil network design techniques further determine values of L 250 and L 255, as well parameters of L 250 and L 255, according to the value of $C_L$ 245. To achieve the condition where $C_B=C_L/12$ to maximize bandwidth of the input/output node of the IC, the physical capacitor $C_{BL}$ typically is included as described.

In accordance with the inventive arrangements disclosed within this specification, $C_B$ and $C_L/12$ can be compared to then design the inductors. Loopback capacitances $C_{PD}$ 275 and $C_{TM}$ 270 are modeled and included in the design technique. $C_{TM}$ 270 and $C_{PD}$ 275 can be determined via a calculation based on silicon data, a two or three-dimensional EM simulation extracted from layout databases, or any other method of deriving the parasitic capacitance associated with $R_{TM}$ 260 and input/output pad 210. Using such techniques, an initial estimate of $C_{BI}$ 265 for inductors L 250 and L 255 can be made. For example, $C_{BI}$ 265 can be initially estimated using a value for inductors L 250 and L 255 that provides desired bandwidth for the input/output node to the IC. Further details regarding the design of a T-coil network, in accordance with one or more embodiments disclosed herein, is provided with reference to FIG. 3.

Figure 3:
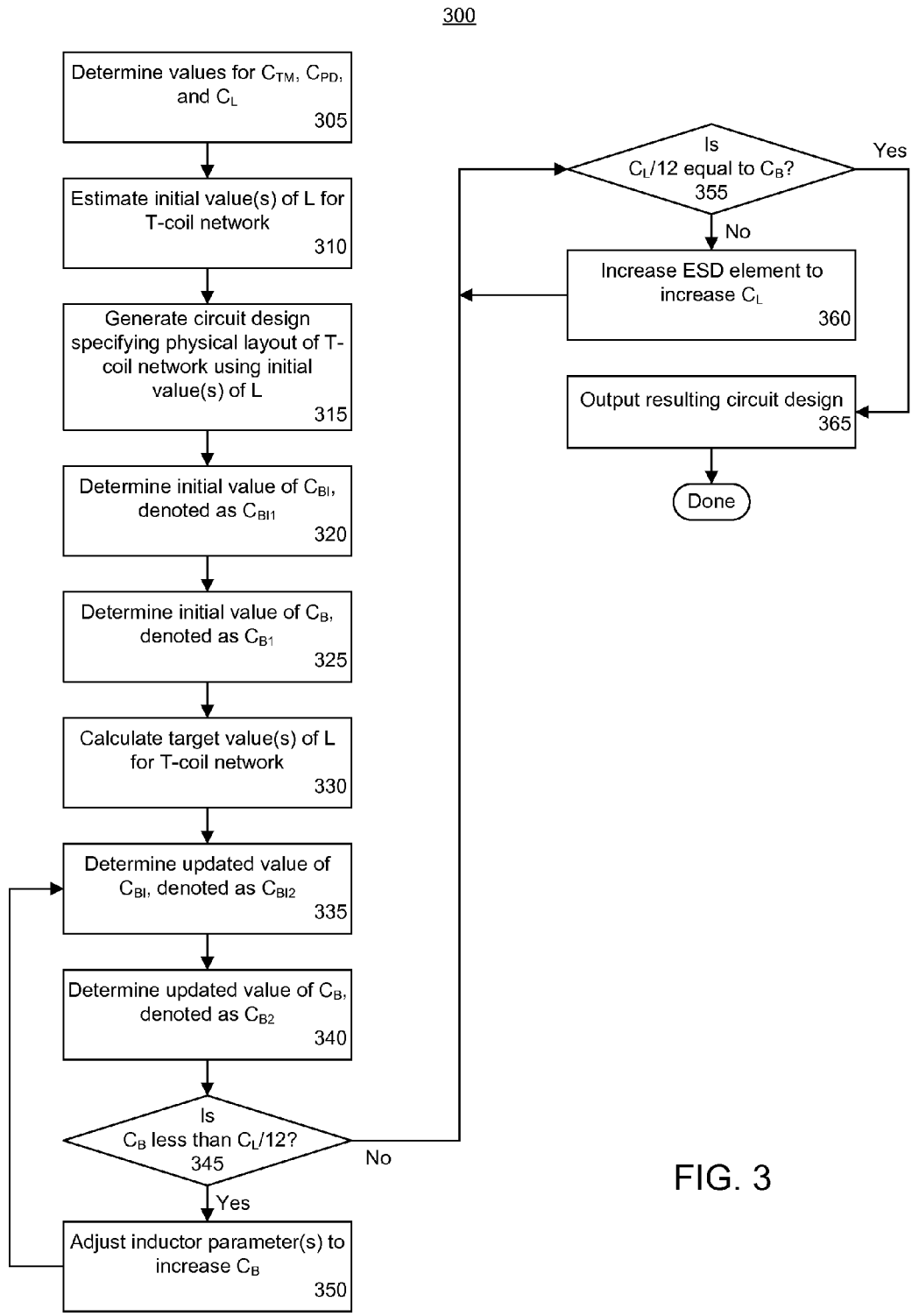
FIG. 3 is a flow chart illustrating a method of designing a T-coil network for ICs in accordance with another embodiment of the present invention.

FIG. 3 is a flow chart illustrating a method 300 of designing a T-coil network for use within an IC in accordance with another embodiment of the present invention. Method 300 can be implemented using a system as described with reference to FIG. 1. In general, method 300 describes a method of T-coil network design for increasing bandwidth and ESD performance at an IC input/output node. In doing so, method 300 utilizes the circuit design modeled and described with reference to FIG. 2.

Beginning in step 305, the system can determine values for the parasitic capacitance of the termination resistor $C_{TM}$, the parasitic capacitance of the pad of the input/output node $C_{PD}$, and the load capacitance $C_L$. This information can be obtained from a database, for example, given that the characteristics of the pad, the T-coil resistor, and the capacitance of the input/output device are known. The values, for instance, can be determined, or will have been determined, from prior simulations or the measured characteristics of prior implemented ICs using a same manufacturing process.

In step 310, the system can estimate a value of L, referring to each of the inductors of the T-coil network. Initially, the value of L can be estimated based upon a variety of factors such as the desired bandwidth of the input/output of the IC, a selected amount of ESD protection in terms of the number and type of ESD devices used, etc. In step 315, a physical description of the inductors can be generated. The physical description of the inductors can be modeled as described with reference to FIG. 2 and include a physical model of each of the various parameters of the inductors. The physical description of the inductors can be determined using the value of L determined in step 310. For example, given initial values of L determined in step 310, the system can automatically generate a physical description of the inductors that is expected to provide the initial value of L determined in step 310 using an EM simulator to perform an EM simulation. The physical description generated can, for example, specify values including, but not limited to, number of windings of each inductor, initial width of the windings, a value of k, and the like. These parameters can be determined based upon the initially determined value of inductance L.

In step 320, the system can determine an initial value of the inter-winding capacitance $C_{BI}$. The initial value of $C_{BI}$, denoted as $C_{BI1}$, can be determined according to the circuit design of the T-coil network described in step 315 where the estimated values of L from step 310 are inserted into the circuit design specifying a physical layout of the T-coil network as described with reference to FIG. 2. In one embodiment, the initial value of $C_{BI}$, denoted as $C_{BI1}$, can be determined by the EM simulator and extracted from an EM simulation. The EM simulation can be performed by the system or another electronic automation design tool and then provided to the system. In one aspect, the EM simulation described with reference to steps 315 and 320 can be one, e.g., a single, EM simulation from which the physical parameters of the inductors and the initial value of $C_{BI}$ are determined.

In step 325, the system can determine an initial value of $C_B$, denoted as $C_{B1}$, using the inter-winding capacitance $C_{BI}$ determined in step 320. As noted with reference to FIG. 2, $C_B = [(C_{TM} * C_{PD})/(C_{TM} + C_{PD})] + C_{BI}$. In step 330, the system can calculate the target value of L for the inductors of the T-coil network using the value of $C_{B1}$ determined in step 325. The target value of L can be determined using the expression $L = 4*(C_{max}*R_{TM}^2)$, where $C_{max}$ represents the greater of the value of either $C_B$ or $C_L/12$. In this example, $C_B$ can be replaced with $C_{B1}$. The value of $C_L$ can be the value determined in step 305.

Using the target value for L calculated in step 330, the system can determine an updated value of $C_{BI}$, denoted as $C_{BI2}$, in step 335. In one embodiment, the value of $C_{BI2}$ can be calculated using a three dimensional EM simulator operating upon the circuit design specifying the physical layout of the T-coil network that incorporates the values of L determined in step 330. It should be appreciated that as the target values of L are used, one or more other parameters of the inductors in the physical model of the T-coil network can be modified and/or updated by the system, e.g., automatically, or in response to a user input/output specifying such updated parameters, to provide the target values of L calculated in step 330. In step 340, the system can determine an updated value of $C_B$, denoted as $C_{B2}$. $C_{B2}$ can be determined according to the previously noted expression where $C_{B2} = [(C_{TM}*C_{PD})/(C_{TM}+C_{PD})]+C_{BI}$, wherein $C_{BI2}$ is used in place of $C_{BI}$.

In step 345, the system can compare the most recent value of $C_B$, e.g., $C_{B2}$, with a load capacitance metric. In one embodiment, the load capacitance metric can be defined as $C_L/12$. Accordingly, the most recent value of $C_B$, e.g., $C_{B2}$, can be compared with $C_L/12$ to determine whether $C_B$ is less than the load capacitance metric. When the value of $C_B$ is less than the value of $C_L/12$, method 300 can continue to step 350. In step 350, one or more parameters of the inductors can be adjusted. For example, as noted, the windings of the inductors within the T-coil network, as specified in the physical layout of the circuit design, can be adjusted to change the value of $C_B$. More particularly, the width of the windings of the inductors of the T-coil network can be increased. Increasing the width of the windings of the inductors of the T-coil network increases the inter-winding capacitance $C_{BI}$, which therefore increases the value of $C_B$. Increasing the width of the windings of the inductors of the T-coil network also decreases the series resistance through the inductors L, which increases ESD performance of the T-coil network. Thus, after step 350, method 300 can loop back to step 335 to continue processing.

When the value of $C_B$ is greater than or equal to the value of the load capacitance metric, in this case $C_L/12$, method 300 can proceed to step 355. It should be appreciated that when the value of $C_L$ divided by 12, e.g., the load capacitance metric, is equal to $C_{B2}$, the bandwidth of an input/output node utilizing the T-coil network specified by the circuit design is maximized. More particularly, the bandwidth of the flat time delay response is maximized.

In step 355, the system can determine whether the value of the load capacitance metric $C_L/12$ is equal to the value of $C_B$. When the value of $C_L/12$ is equal to the value of $C_B$, method 300 can continue to step 365 as bandwidth of the flat time delay response has been maximized. Maximizing flat time delay response effectively minimizes distortion of the received digital signal. When the value of $C_L/12$ is not equal to the value of $C_B$, e.g., when the value of $C_B$ is greater than the value of $C_L/12$, method 300 can proceed to step 360. In step 360, the amount of ESD protection provided to the input/output node of the IC can be increased. The circuit design specifying the physical layout of the T-coil network can be updated to include increased ESD protection. For example, a number of ESD devices can be increased or a size of the ESD devices at the output of the T-coil network can be increased. Increasing the amount of ESD protection as described increases the parasitic capacitance $C_L$. Method 300 can iterate so that $C_L$ continues to increase until of $C_L/12$ is equal, or approximately equal within some predetermined tolerance or range, of the value of $C_B$ as determined in step 355.

In step 365, a circuit design can be output. The circuit design can specify the physical layout of the T-coil network, and thus, parameters including, but not limited to, values for the inductors, width of the windings of the inductors, the load capacitance, the parasitic bridge capacitance, the amount of ESD protection, and the like.

One or more embodiments disclosed within this specification relate to the design of a T-coil network for use with input/output nodes of an IC. The one or more embodiments provide a more accurate model and process for determining the bridge capacitance of the T-coil network. The T-coil network design processes disclosed herein are iterative in nature and seek to maximize bandwidth of the T-coil network by varying loop width of the inductors of the T-coil network and/or increasing the ESD protection provided to the input/output node of the IC. The one or more embodiments disclosed herein do not require the inclusion of a physical capacitor $C_{BL}$ to maximize bandwidth as do conventional T-coil network design techniques.

Further, the one or more embodiments disclosed within this specification can be used as part of, or within, a design/optimization practice or technique to provide guidance to maximize performance of a T-coil network. One or more steps can be performed manually and provided to the system as input/outputs. For example, in lieu of using simulations, a circuit designer may fabricate test ICs from which values of parasitic capacitance and/or other parameters of the T-coil network may be determined. The circuit designer may continue to optimize the inductors and/or T-coil network through multiple iterations of adjusting values as described within this specification and creating further test ICs in lieu of simulations.

The flowchart in the figures illustrates the architecture, functionality, and operation of possible implementations of systems, methods and computer program products according to one or more embodiments of the present invention. In this regard, each block in the flowchart may represent a module, segment, or portion of code, which comprises one or more portions of executable program code that implements the specified logical function(s).

It should be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It also should be noted that each block of the flowchart illustrations, and combinations of blocks in the flowchart illustrations, can be implemented by special purpose hardware-based systems that perform the specified functions or acts, or combinations of special purpose hardware and executable instructions.

One or more embodiments of the present invention can be realized in hardware or a combination of hardware and software. The one or more embodiments can be realized in a centralized fashion in one system or in a distributed fashion where different elements are spread across several interconnected systems. Any kind of data processing system or other apparatus adapted for carrying out the methods described herein is suited.

One or more embodiments of the present invention further can be embedded in a device such as a computer program product, which comprises all the features enabling the implementation of the methods described herein. The device can include a data storage medium, e.g., a computer-usable or computer-readable medium, storing program code that, when loaded and executed in a system comprising memory and a processor, causes the system to perform the functions described herein. Examples of data storage media can include, but are not limited to, optical media, magnetic media, magneto-optical media, computer memory such as random access memory or hard disk(s), or the like.

The terms "computer program," "software," "application," "computer-usable program code," "program code," "executable code," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, program code can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open language. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system.

One or more embodiments disclosed herein can be embodied in other forms without departing from the spirit or essential attributes thereof. Accordingly, reference should be made to the following claims, rather than to the foregoing specification, as indicating the scope of the embodiments of the present invention.

What is claimed is:

1. A circuit, comprising:
a first inductor comprising a first end and a second end;
wherein the first end of the first inductor forms an input node of the circuit;
a second inductor comprising a first end and a second end;
wherein the second end of the first inductor is coupled to the first end of the second inductor forming an output node of the circuit;
a resistor coupled to the second end of the second inductor; and
an electrostatic discharge structure coupled to the output node and configured to provide an amount of electrostatic discharge protection;
wherein the amount of electrostatic discharge protection is based on a parasitic bridge capacitance and a load capacitance metric; and
wherein the parasitic bridge capacitance is calculated as a function of quantities comprising a parasitic capacitance of the resistor within a T-coil network denoted as $C_{TM}$, a parasitic capacitance of an input/output pad coupled to an input of the T-coil network denoted as $C_{PD}$, and an inter-winding capacitance of the first and second inductors denoted as $C_{BI}$.

2. The circuit of claim 1, wherein the parasitic bridge capacitance is calculated according to $C_B=[(C_{TM}*C_{PD})/(C_{TM}+C_{PD})]+C_{BI}$, wherein the parasitic bridge capacitance is denoted as $C_B$.

3. The circuit of claim 1, wherein the electrostatic discharge structure comprises a first electrostatic discharge device coupled to the output node, and a second electrostatic discharge device also coupled to the output node.

4. The circuit of claim 1, wherein the resistor has a resistance of approximately 50 ohms.

5. The circuit of claim 1, wherein the load capacitance metric is one twelfth of the parasitic bridge capacitance.

6. A circuit, comprising:
a first inductor comprising a first end and a second end;
wherein the first end of the first inductor forms an input node of the circuit;
a second inductor comprising a first end and a second end;
wherein the second end of the first inductor is coupled to the first end of the second inductor forming an output node of the circuit;
a resistor coupled to the second end of the second inductor; and
an electrostatic discharge structure coupled to the output node and configured to provide an amount of electrostatic discharge protection;
wherein a parameter of at least one of the first inductor or the second inductor is based on a parasitic bridge capacitance and a load capacitance metric; and
wherein the parasitic bridge capacitance is calculated as a function of quantities comprising a parasitic capacitance of the resistor within a T-coil network denoted as $C_{TM}$, a parasitic capacitance of an input/output pad coupled to an input of the T-coil network denoted as $C_{PD}$, and an inter-winding capacitance of the first and second inductors denoted as $C_{BI}$.

7. The circuit of claim 6, wherein the parasitic bridge capacitance is calculated according to $C_B=[(C_{TM}*C_{PD})/(C_{TM}+C_{PD})]+C_{BI}$, wherein the parasitic bridge capacitance is denoted as $C_B$.

8. The circuit of claim 6, wherein the electrostatic discharge structure comprises a first electrostatic discharge device coupled to the output node, and a second electrostatic discharge device also coupled to the output node.

9. The circuit of claim 6, wherein the resistor has a resistance of approximately 50 ohms.

10. The circuit of claim 6, wherein the load capacitance metric is one twelfth of the parasitic bridge capacitance.

11. A T-coil network, comprising:
a first inductor;
a second inductor that is coupled to the first inductor; and
a resistor that is coupled to the second inductor,
wherein a parameter of the first inductor and the second inductor is based on a parasitic bridge capacitance and a load capacitance metric; and
wherein the parasitic bridge capacitance is calculated as a function of quantities comprising a parasitic capacitance of the resistor within a T-coil network denoted as $C_{TM}$, a parasitic capacitance of an input/output pad coupled to an input of the T-coil network denoted as $C_{PD}$, and an inter-winding capacitance of the first and second inductors denoted as $C_{BI}$.

12. The T-coil network of claim 11, wherein the parasitic bridge capacitance is calculated according to $C_B=[(C_{TM}*C_{PD})/(C_{TM}+C_{PD})]+C_{BI}$, wherein the parasitic bridge capacitance is denoted as $C_B$.

13. The T-coil network of claim 11, wherein the load capacitance metric depends upon parasitic capacitance of a load coupled to an output of the T-coil network.

14. The T-coil network of claim 11, wherein the resistor has a resistance of approximately 50 ohms.

15. The circuit of claim 11, wherein the load capacitance metric is one twelfth of the parasitic bridge capacitance.

16. A circuit, comprising:
the T-coil network of claim 11;
a first electrostatic discharge device coupled to an output of the T-coil network;
a second electrostatic discharge device coupled to the output of the T-coil network;
an input pad coupled to an input of the T-coil network; and
another resistor coupled to the input pad;
wherein the resistor and the other resistor each have a resistance of approximately 50 ohms.

* * * * *